United States Patent

Neef

[11] 4,030,974
[45] June 21, 1977

[54] CORE REACTOR

[75] Inventor: Hanns-Joachim Neef, Julich, Germany

[73] Assignee: Kernforschungsanlage Julich Gesellschaft mit beschrankter Haftung, Julich, Germany

[22] Filed: Sept. 9, 1974

[21] Appl. No.: 504,535

[30] Foreign Application Priority Data

Sept. 8, 1973 Germany .......................... 2345431

[52] U.S. Cl. .......................... 176/58 PB; 176/36 R; 176/86 R; 176/31

[51] Int. Cl.² .......................................... G21C 3/26

[58] Field of Search .................. 176/17, 30, 37, 33, 176/86 R, 91 R, 92, 93, 58, DIG. 2, 31, 32

[56] References Cited

UNITED STATES PATENTS

| 2,812,303 | 11/1957 | Daniels | 176/30 |
|---|---|---|---|
| 2,987,488 | 6/1961 | Clark | 176/DIG. 2 |
| 3,048,534 | 8/1962 | Tonks | 176/33 |
| 3,164,525 | 1/1972 | Wetch et al. | 176/33 |
| 3,255,083 | 6/1966 | Klahr | 176/33 |
| 3,321,371 | 5/1967 | Kambara et al. | 176/33 |
| 3,519,536 | 7/1970 | Rausch | 176/36 |
| 3,728,218 | 4/1973 | Gnutzmann et al. | 176/36 |
| 3,751,334 | 8/1973 | Sturmer et al. | 176/36 R |

FOREIGN PATENTS OR APPLICATIONS

| 1,021,452 | 8/1966 | United Kingdom | 176/92 R |
|---|---|---|---|
| 874,487 | 8/1961 | United Kingdom | 176/92 R |
| 946,114 | 1/1964 | United Kingdom | 176/50 |
| 803,708 | 10/1958 | United Kingdom | 176/33 |

Primary Examiner—Samuel W. Engle
Assistant Examiner—S. A. Cangialosi
Attorney, Agent, or Firm—Walter Becker

[57] ABSTRACT

A core reactor with a reflector formed of graphite and containing a filling of ball-shaped fuel and/or breeder elements, and with an arrangement formed of absorber rods and insertable through the reflector wall into the filling. The graphite of the reflector wall, with the exception of that part of the wall which is penetrated by the absorber rod arrangement after the penetration of the rods into the fill of the fuel and/or breeder elements, or which surrounds the absorber rod arrangement, is doped with substances acting as neutron poison.

3 Claims, 3 Drawing Figures

CORE REACTOR

The present invention relates to a core reactor with a reflector formed of graphite and containing a fill of ball-shaped fuel and/or breeder elements, and with an arrangement which is formed of absorber rods adapted to be moved into said fill through the reflector wall. The neutrons which become free during the fission process are absorbed by the absorbing material contained in the rods, so that the reactivity of the reactor is lowered.

Core reactors with a fill of ball-shaped fuel and/or breeder elements are generally controlled by absorber rods insertable into the fill while by changing the depth of penetration of the absorber rods into the fill, the reactivity of the core reactor is increased or decreased. The absorber rods introduced into the fill exert a pressure upon the fuel and/or breeder elements adjacent said absorber rods, which pressure is all the higher the greater the number of the rods is and the deeper the rods enter into the fill. The maximum pressure exerted in this connection frequently reaches the limit of the mechanical loadability of the fuel and/or breeder elements.

For this reason efforts were made to reach the desired control or turn-off effect with as small a penetration depth of the absorber rods as possible.

It is known with core reactors with a fill of fuel and/or breeder elements to avoid too great penetration depths of the absorber rods, and to do this by providing a plurality of rods for controlling and turning off the reactor which rods have simultaneously to be introduced into the reactor core. Experience has shown, however, that the neutron flux is not lowered in the regions of the fill which are not reached by the absorber rods, to the same extent as in those regions which have been penetrated by the absorber rods. The neutron flux evades the absorber rods so that the rods have to be moved deeper into the fill than would be the case when the neutron flux in those regions of the fill which were not reached by the abosorber rods could be lowered to the same extent as in the regions reached or penetrated by the absorber rods.

If a core reactor with a reflector formed of graphite and containing a fill of ball-shaped fuel and/or breeder elements, and with an arrangement formed by absorber rods movable through the reflector walls into the fill, is operated in such a way that the fill and/or breeder elements pass the fill only once while the absorber rods are moved into the fill from above, it has been found that the maximum of the neutron flux which during the operation of the reactor prevails in the upper region of the fill, will during the turn-off phase be displaced into the lower region of the fill. While due to the fact that in view of this way of operation the fuel and/or breeder elements in the lower portion of the fill will have a higher proportion of fission products than the fill and/or breeder elements in the upper portion of the fill, more neutrons will be absorbed by the fission products in the lower portion of the fill then in the upper portion of the fill. However, in spite of this fact and in spite of the arrangement of a plurality of absorber rods, in particular the penetration depth of the absorber rods required for the turning-off process is still so great that a very high mechanical stress exerted upon the fuel and/or breeder elements and also upon the absorber rods has to be tolerated.

It is an object of the present invention to provide a core reactor with a reflector which is formed of graphite and contains a fill of ball-shaped fuel and/or breeder elements, in which without increasing the movement of the absorber rods or providing another distribution over the outer circumference of the reflector during the moving of the absorber rods into the fill, the neutron flux will be lowered also in those regions of the reactor which are not reached or penetrated by the absorber rods. This object has been realized with a core reactor of the above mentioned type by the fact that the graphite of the reflector wall with the exception of that portion of the wall that is penetrated by the absorber rod arrangement after the entering of said rods into the fill of the fuel and/or breeder elements or which surrounds the absorber arrangement moved into the fill, is doped with substances acting as neutron poison.

This invention is based on the finding that when operating the reactor, the neutron flux in that portion of the reflector which is not penetrated by the absorber rods contributes in a rather negligible way to the total neutron flux of the reactor, whereas in the turning-off phase and —even though to a lesser extent — in the control phase represents a remarkable proportion of the total neutron flux.

While substances acting as neutron poison and introduced in such proportions of the reflector will during the operation of the reactor for all practical purposes not reduce the reactivity of the reactor, the reduction in the reactivity brought about in the turning-off phase by the substances acting as neutron poison is considerable. This step thus brings about that the penetration depth required for control in the turning-off phase is reduced. Thus, if the absorber rods are movable from above into the fill surrounded by the reflector formed by the bottom and ceiling reflector, the graphite of the bottom reflector or the graphite of the bottom reflector and of the lower portion of the side reflector is doped with substances acting as neutron poison. Due to this step, the neutron flux displaced by the moved-in absorber rods to the lower regions of the fill and of the reflector is additionally lowered and thus brings about that aleady at a low penetration depth of the rods, the desired control of the reactor occurs or the reactor is turned off.

It has proved advantageous to employ as neutron poison hafnium and/or boron or the like. In this connection it may be advantageous to employ such graphites the natural content in boron of which was reduced beforehand prior to the purification of the graphite. It is expedient that the substances acting as neutron poison are so doped over the thickness (measured in cm) of the wall of the reflector that $e^{-\Sigma_a \cdot d} \leq 10^{-3}$ in which formula $\Sigma_a$ stands for the mean macroscopic effective cross section for neutron absorption (measured in $cm^{-1}$). Thus, it is not necessary that the substances acting as neutron poison are distributed in a homogeneous manner over the graphite of the reflector.

A great advantage of the core reactor according to the invention consists in that the number of the required absorber rods is less than is required with heretofore known core reactors of the same design. In addition thereto, with the same number of absorber rods as used with heretofore known core reactors of the same design it is also possible to keep the penetration depth of the absorber rods for controlling and turning off action considerably less so that smaller and space saving driving units for the absorber rods are applicable than was the case heretofore.

Figure 2:
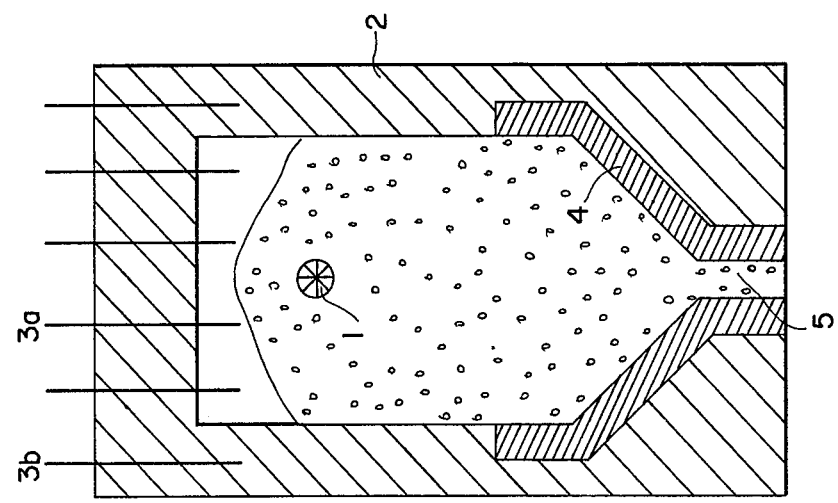
FIG. 2 shows the reactor core of FIG. 1 with the control rods inserted into the fill or dumping layer.
Figure 1:
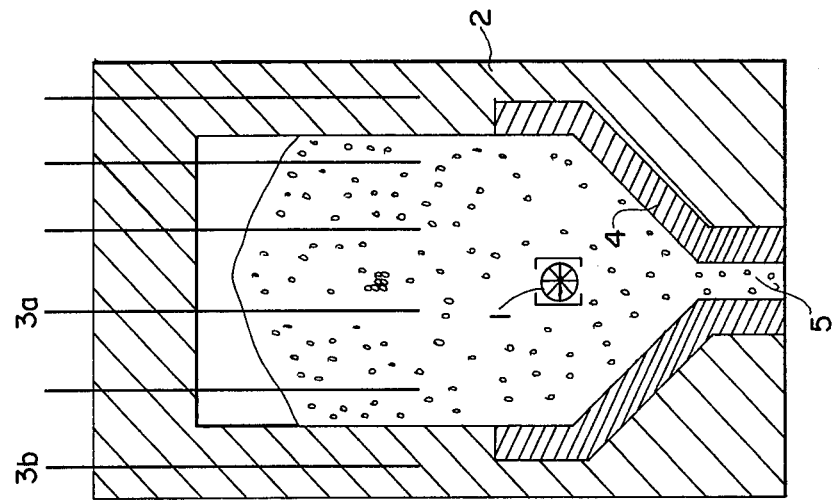
FIG. 1 shows a reactor core of a ball-pile reactor according to the invention.

The reactor of FIGS. 1 and 2 is formed with a filler dump layer 1 of ball-pile fuel elements in a reflector 2. The fuel elements in the reflector are spaced below the top of the reflector, which also has a bottom passage 5 for withdrawal of the fuel elements.

Control or absorber rods $3a$ pass through the top wall of the reflector and may be inserted into the fuel elements as shown in FIG. 2, to control reactivity of the core. Rods $3b$ may also be moved into the reflector wall to limit activity of the reactor.

The neutron poison, such as boron or hafnium, on the lower wall of the reflector, below the range of movement of the control rods, is shown at 4, for absorption of neutrons in that region, especially when the control rods are inserted into the upper portion of the dump layer, as described above.

Figure 3:
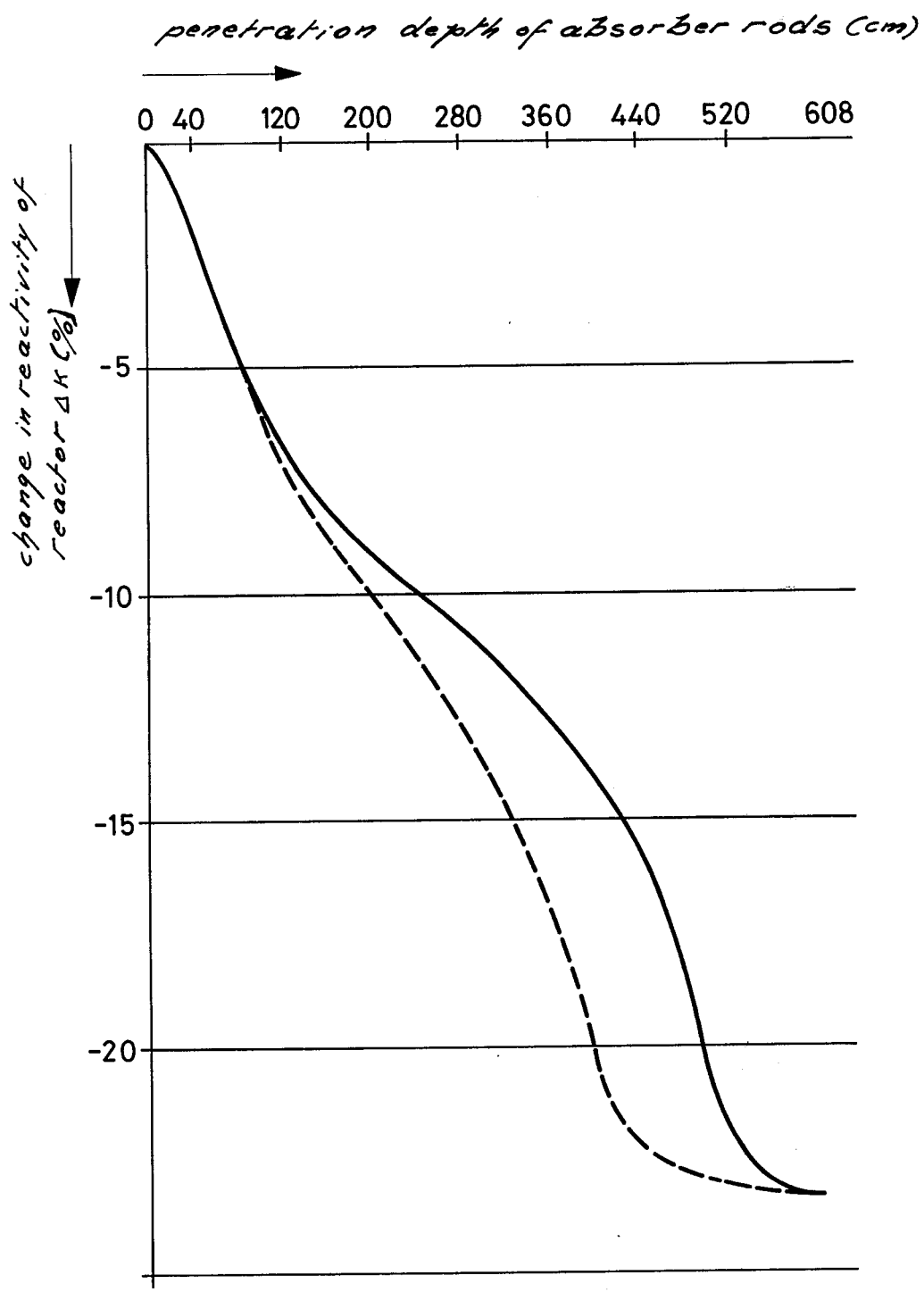
FIG. 3 shows curves of reactivity conforming to penetration depth of the control rods, the two curves illustrating the difference in the reactor of this invention in comparison with a prior art device.

FIG. 3 shows the reduction of the reactivity in conformity with the penetration depth of the absorber rods, for two core reactors of the same output and the same geometric dimensions with the same way of operation while one of the two core reactors shows the features according to the present invention. Both core reactors have a total output of 500MW$_{th}$. The height of the core amounts approximately to 600cm, the radius amounts to approximately 240cm. The fuel elements consist of coated particles of UO$_2$ arranged in a graphite ball. These balls have an outer radius of 3cm while the fill density of the balls in the core amounts to 0.61. The heavy metal content per each ball amounts to 10.739 grams per ball. As cooling gas, helium is employed with a pressure of 40 atmospheres, and the thickness of the upper reflector amounts to 40cm whereas the thickness of the lower reflector amounts to 150cm and the thickness of the mantle reflector amounts to 100cm. The graphite density is in the vicinity of 1.60 grams per cm$^3$. The number of the absorber rods amounts for both reactors with the same dimension and the same arrangement to 31.

Referring now to the drawing, the change in the reactivity $\Delta k$ of a reactor is plotted on the ordinate and indicated in %. On the abscissa there is plotted in cm the penetration depth of the absorber rods. The solid line shows the dependency of the decrease in the reactivity from the penetration depth of the absorber rods with a core reactor of the art prior to the present invention. The dash line shows the relationship of the reduction in the reactor reactivity to the penetration depth of the absorber rods in a core reactor according to the present invention with which thus the reflector graphite with the exception of that portion penetrated by the absorber rods and which surrounds the absorber rods is doped with neutron poisons. The doping is effected with boron, and more specifically in such a way that the condition $e^{-\Sigma} a^{\cdot d} \leq lo^{-3}$ is made. As will be evident from a comparison of the two graphs shown in the drawing, the reduction of the reactivity in view of the penetration by the absorber rods with the core reactor forming the prior art differs at the start only slightly from the reduction in the reactivity of a core reactor according to the invention. However, the difference between the decrease in the reactivity of the two reactors becomes considerable with a penetration depth of the absorber rods of 200cm whereupon this difference becomes greater and greater. As will be seen from the drawing, the reduction in the reactivity $\Delta k$ with a core reactor according to the invention is already 14% even though the penetration depth of the absorber rods amounts only to 290cm, whereas with a core reactor of the prior art with the same design and the same output, this reduction is obtained only at a penetration depth of 390cm.

It is, of course, to be understood that the present invention is, by no means, limited to the specific core reactor referred to above but also comprises any modifications within the scope of the appended claims.

What I claim is:

1. A ball-pile reactor having a fill of elements selected from the group consisting of fuel and breeder elements which pass through said reactor with a cooling medium from a charging side in a dump material layer, an absorber rod arrangement including control rods that directly engage said elements, said control rods being movable into said fill from the charging side in the pass-through direction of the elements, said reactor comprising a reflector of graphite having the graphite of its wall below the range of movement of said control rods doped with a substance constituting a neutron poison selected from the group consisting of hafnium, boron, and other elements having a neutron cross section $\Sigma_a$ (in cm.$^{-1}$) such that $e^{-\Sigma} a^{\cdot d} \leq 10^{-3}$, in which $\Sigma_a$ stands for the macroscopic effective cross section for neutron absorption measured in cm.$^{-1}$, and $d$ stands for the thickness of the reflector wall measured in cm., said neutron poison doping only that part of the reflector which surrounds the range of the fill not penetrated by the control rods.

2. A ball-pile reactor as in claim 1, wherein the reflector is doped with hafnium as the neutron poison.

3. A ball-pile reactor having a fill of elements selected from the group consisting of fuel and breeder elements which pass through said reactor with a cooling medium from a charging side in a dump material layer, an absorber rod arrangement including control rods that directly engage said elements, said control rods being movable into said fill from the charging side in the pass-through direction of the elements, said reactor comprising a reflector of graphite having the graphite of its wall below the range of movement of said control rods doped with boron, said boron doping only that part of the reflector which surrounds the range of the fill not penetrated by the control rods.

* * * * *